(12) United States Patent
Kilmer

(10) Patent No.: US 6,555,251 B2
(45) Date of Patent: Apr. 29, 2003

(54) MULTI-LAYER, HEAT TREATABLE BRAZING SHEET WITH ALUMINUM INTERLAYER

(75) Inventor: Raymond J. Kilmer, Lancaster, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/025,401

(22) Filed: Dec. 19, 2001

(65) Prior Publication Data

US 2002/0142185 A1 Oct. 3, 2002

Related U.S. Application Data

(60) Provisional application No. 60/257,225, filed on Dec. 21, 2000, provisional application No. 60/257,241, filed on Dec. 21, 2000, provisional application No. 60/257,258, filed on Dec. 21, 2000, and provisional application No. 60/257,259, filed on Dec. 21, 2000.

(51) Int. Cl.⁷ ............................................. B32B 15/20
(52) U.S. Cl. .................. 428/654; 138/142; 138/143; 138/177; 165/180; 165/905; 228/144; 228/207; 228/262.5; 228/262.51; 428/925; 428/926; 428/933
(58) Field of Search ................ 428/654, 925, 428/926, 933; 228/144, 207, 262.5, 262.51; 138/142, 143, 177; 165/180, 905

(56) References Cited

U.S. PATENT DOCUMENTS

| | | | |
|---|---|---|---|
| 3,917,151 A | 11/1975 | Robinson | 228/220 |
| 4,146,164 A | 3/1979 | Anderson et al. | 228/158 |
| 4,489,140 A | 12/1984 | Pulliam et al. | 428/654 |
| 4,556,165 A | 12/1985 | Yamawaki et al. | 228/223 |
| 4,727,001 A | 2/1988 | Takemoto et al. | 428/654 |
| 5,190,596 A | 3/1993 | Timsit | 148/23 |
| 5,350,436 A | 9/1994 | Takezoe et al. | 75/314 |
| 5,422,191 A | 6/1995 | Childree | 428/654 |
| 5,476,725 A | 12/1995 | Papich et al. | 428/654 |
| 5,744,255 A | 4/1998 | Doko et al. | 428/654 |
| 5,971,258 A | 10/1999 | Eichhorn et al. | 228/262.51 |
| 6,063,510 A | 5/2000 | Inabayashi et al. | 428/654 |
| 6,129,143 A * | 10/2000 | Hasegawa et al. | 428/654 |
| 6,152,354 A | 11/2000 | Childree | 228/206 |

FOREIGN PATENT DOCUMENTS

WO  WO00/71784 A2  11/2000  ............ C25D/5/44

* cited by examiner

*Primary Examiner*—Robert R. Koehler
(74) *Attorney, Agent, or Firm*—Julie W. Meder; Gary P. Topolosky

(57) ABSTRACT

A four layer composite including a first interliner positioned between a 4xxx series braze clad and a core alloy and a second interliner positioned on the opposite side of the core alloy from the first interliner. At least one of the first and second interliners has higher amounts of Si than that of the core alloy adjacent thereto. The higher Si content interliner preferably contains about 0.02–1.1 wt. % Si.

28 Claims, 1 Drawing Sheet

MULTI-LAYER, HEAT TREATABLE BRAZING SHEET WITH ALUMINUM INTERLAYER

RELATED APPLICATIONS

This application claims the benefit under 35 U.S.C. 119(e) of the following United States Applications, all filed Dec. 21, 2000: Ser. No. 60/257,225 entitled "Multi-Layer, Heat Treatable Brazing Sheet With 6XXX Aluminum Interlayer", Ser. No. 60/257,241 entitle "Multi-Layer, Heat Treatable Brazing Sheet With 3XXX Aluminum Interlayer", Ser. No. 60/257,258 entitled "Multi-Layer, Heat Treatable Brazing Sheet With 5XXX Aluminum Interlayer", and Ser. No. 60/257,259 entitled "Multi-Layer, Heat Treatable Brazing Sheet With 7XXX Aluminum Interlayer".

FIELD OF THE INVENTION

This invention relates to heat treatable, aluminum alloy products. More particularly, it relates to a multiple layer alloy product that is brazeable in a process using a fluoride based flux, one example of which is more commonly known as a Nocolok® type flux (commonly referred to as the "Nocolok brazing process"). Nocolok® is a registered trademark of Alcan Aluminium Ltd of Canada.

BACKGROUND OF THE INVENTION

Numerous brazeable aluminum alloys have been patented protected. Representative compositions include those taught by U.S. Pat. Nos. 4,040,822, 5,375,760, 5,520,321, 5,535,939, and 5,564,619. Still other aluminum alloys, not specific to brazing, with Nocolok or otherwise, are taught in U.S. Pat. Nos. 2,096,010, 4,589,932, 5,286,445, 5,522,950 and 5,587,029.

To date, it has been difficult to obtain high post-brazing strengths, with tensile yield strengths (or "TYS" values) greater than about 90 MPa, for sheet product whose inner and outer surfaces braze well per brazing processes employing Nocolok® type fluxes. One approach has been to employ an interliner composed of an Aluminum Association (AA) 3003 alloy or 7072 alloy between a 4000 (or 4xxx) series braze cladding and a magnesium-containing, heat treatable core alloy. This interliner primarily acts as a barrier to magnesium diffusion from the core to the braze cladding. In this way, the composite alloy of this invention can obtain higher strengths while still being brazeable by a Nocolok®-type process.

Known four layer alloy products in this field have predominantly relied on the heat treatable core alloys for elevated, post-brazed strengths. The post braze TYS (tensile yield strength) values of such alloys do not typically exceed about 85 MPa, however, even after extended natural aging times. Such strength depends on the composition of the alloy, aging time and temperature, as well as the cooling rates employed after brazing by a Nocolok® type brazing process. The ability of manufacturers to subsequently reduce the gauge of these product forms depends strongly on these post braze strengths with higher strengths being clearly more desirable and allowing for greater subsequent gauge reductions.

SUMMARY OF THE INVENTION

The present invention relates to a four layer aluminum brazing sheet alloy which may be used as a material in the fabrication of brazed heat exchangers, primarily for folded and/or welded type tubes used in header/tube type heat exchangers (e.g. radiators, heater cores and the like.) The sheet may be fabricated via traditional roll bonding practices or by the practices described in a U.S. patent application filed Oct. 23, 2001 entitled "Simultaneous Multi-Alloy Casting", (inventors Raymond J. Kilmer and J. Lester Kirby), incorporated herein by reference. If this latter practice is used, a thin (less than about 3% of the total composite thickness) divider alloy will be present between at least one and up to three of the interfaces between the four layers described herein. This divider alloy is at least 96% aluminum and serves as a separator/divider to minimize intermixing of the alloys on either side thereof during the casting process. If one or more components of the sheet of the present invention are fabricated via the method of the above-mentioned pending Kilmer et al. patent application, then the sheet will have more than four compositionally distinct layers. The presence of the thin divider alloy does not significantly alter the behavior of the final product nor is it present to intentionally alter the mechanisms described herein. Therefore, all references to four layer products do not necessarily limit the invention to alloys without these dividers. The four layers refer to the compositionally and functionally significant layers of the composite product.

The four layer composite of this invention includes a first interliner positioned between an Aluminum Association ("AA") 4xxx series braze clad alloy and a core alloy and a second interliner positioned on the opposite of the core alloy from the first interliner. At least one of the first and second interliners has higher amounts of Si than that of the core alloy adjacent thereto. The higher Si content interliner preferably contains about 0.02–1.1 wt. % Si, preferably about 0.1–1.1 wt. % Si, most preferably about 0.3–1.1 wt. % Si. The interliners also have low Mg contents to improve the Nocolok brazeability of the product.

DETAILED DESCRIPTION OF PREFERRED EMBODIMENTS

Figure 1:
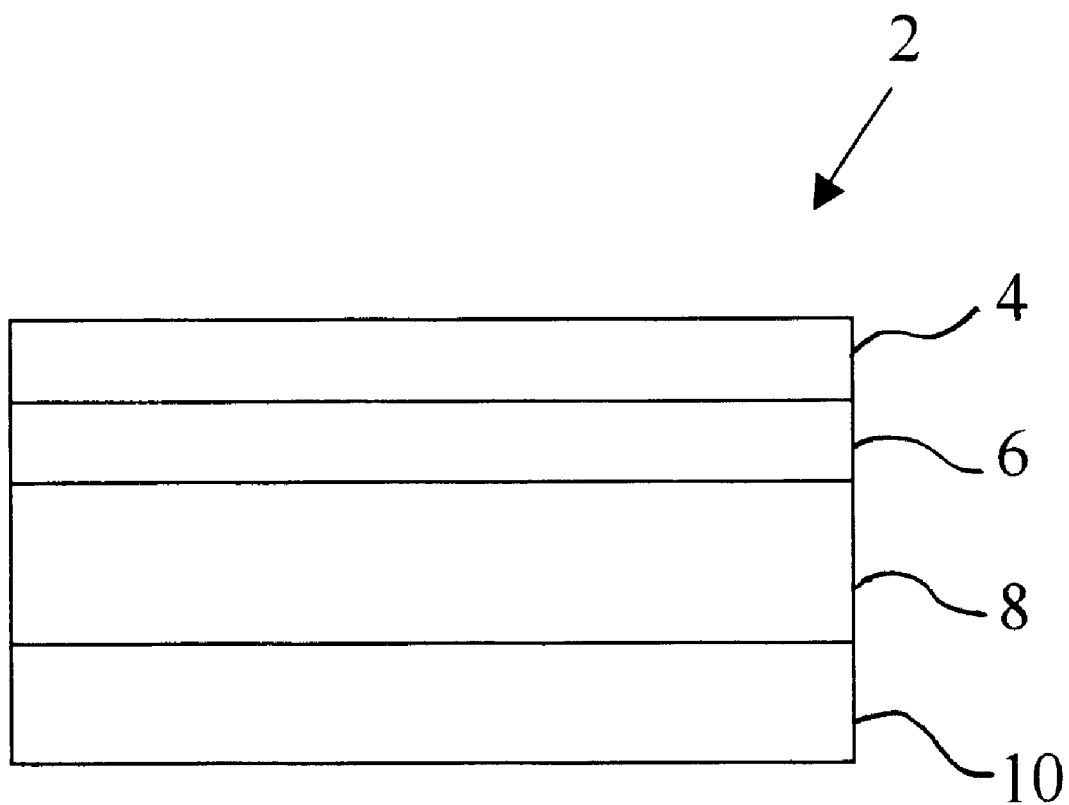
FIG. 1 is a schematic diagram showing the four distinct layers in a preferred embodiment of the brazing sheet of this invention.

All component percentages herein are by weight percent unless otherwise indicated. As used herein, the term "substantially free" means that no purposeful additions of that alloying element were made to the composition, but that due to impurities and/or leaching from contact with manufacturing equipment, trace quantities of such elements may, nevertheless, find their way into the final alloy product.

When referring to any numerical range of values, such ranges are understood to include each and every number and/or fraction between the stated range minimum and maximum. A range of about 5 to 15 wt. % silicon, for example, would expressly include all intermediate values of about 5.1, 5.2, 5.3 and 5.5%, all the way up to and including 14.5, 14.7 and 14.9% Si. The same applies to each other numerical property, relative thickness and/or elemental range set forth herein.

The brazing sheet of the present invention is shown schematically in FIG. 1, Sheet 2 includes four layers, a 4 xxx series braze clad layer 4, a first interliner 6 positioned between the braze clad layer 4 and a core alloy 8, and a second interliner 10 positioned on the opposite side of the core alloy 8 from the first interliner 6. The brazing sheet 2 preferably is up to about 350 microns thick at final gauge, more preferably about 120 to about 250 microns thick. At least one of the alloys of the first and second interliners 6 and 10 has more Si than the core alloy 8 adjacent thereto. The higher Si content interliner preferably contains about 0.02–1.1 wt. % Si, preferably about 0.1–1.1 wt. % Si, most preferably about 0.3–1.1 wt. % Si. In addition, the sum of Si in the first and second interliners 6 and 10 and the core 8 preferably is at least about 0.4 wt. %. When the second interliner 10 is used as a waterside liner in a heat exchanger, the interliner 10 may contain high levels of Zn (up to about 6 wt. %) to provide internal corrosion resistance.

The preferred composition and preferred relative thicknesses of each layer of the brazing sheet 2 are summarized in Table 1, with more preferred ranges listed parenthetically beneath their respective, broader ranges.

waterside). Higher Si, Mg and Cu content alloys are also generally more sensitive to quench rate sensitivity after brazing (i.e. the non-uniform distribution of solute in the alloy which can lead to lower post brazed strengths and poor corrosion resistance). Table 1 lists the first interliner 6 with slightly different alloying composition content from second interliner 10. It is to be understood, however, that both interliners 6 and 10 may be made of the same composition. In some instances, it will be beneficial (especially from a corrosion resistance standpoint) if interliners 6 and 10 vary in composition. The interliners 6 and 10 may have the same or different thickness. It should also be understood that the placement of interliners 6 and 10 can be transposed, i.e. with interliner 10 located between the clad layer 4 and core layer 8, and interliner 6 being exteriorly located adjacent the core

TABLE 1

|  | Clad layer | First interliner | Core layer | Second Interliner |
|---|---|---|---|---|
| % Thickness at final gauge | 5–20% | 10–25% | Balance | 10–30% |
| Si | 5–15 | 0.02–1.1 (0.1–1.1) (0.3–1.1) | 0.9 max | 0.02–1.1 |
| Fe | 0.6 max (0.15–0.3) | 0.6 max (0.15–0.3) | 0.6 max (0.15–0.3) | 0.6 max (0.15–0.3) |
| Mn | 0.1 max | 1.7 max | 0.5–1.7 | 1.7 max |
| Cr | 0.2 max | 0.3 max | 0.3 max | 0.3 max |
| Cu | 0.3 max (0.1 max) | 0.3 max (0.1 max) | 0.02–1.2 | 0.25 max (0.1 max) |
| Mg | 0.1 max | 0.1 max (0.05 max) | 0.1–1 (0.25–0.6) | 0.1 max (0.05 max) |
| Zn | 4 max | 4 max* | 0.2 max | 6 max* (1–4) |
| Ti | 0.25 max | 0.25 max (0.1–0.25) | 0.02–0.25 (0.10–0.25) | 0.25 max |
| Zr | 0.02 max | 0.10 max (0.01 max) | 0.10 max (0.01 max) | 0.10 max (0.01 max) |
| Other |  | V = 0.2 max In = 0.2 max | V = 0.2 max | V = 0.2 max In = 0.2 max |
| Al and incidental impurities | Balance | Balance | Balance | Balance |

*In additions of up to 0.2 wt. % optional.

After an aging period of about 30 days at 90° C. (a typical service environment temperature for a radiator/heater tube), the post braze TYS of the sheet 2 is expected to exceed about 60 MPa. Post brazed and aged TYS and UTS values have not been observed to exceed 80 MPa and 150 MPa respectively when the Mg content of the core alloy had less than about 0.25 wt. %. High strengths (TYS greater than 90 MPa and UTS greater than 160 MPa) post brazed and aged (30 days at 90C.) may be generally observed when the Mg content in the core is greater than about 0.35 wt. %, and Si content in at least one of the three layers (first interliner 6, core 8 or second interliner 10) is greater than 0.7 wt. %. When the Mg content in the core is greater than about 0.45 wt. %, these strength levels are attainable with lower Si content alloys. It has also been observed that the post brazed and aged strength levels increase with increasing Cu content in the core 8. As a substantial amount of interdiffusion occurs during brazing, the Si can diffuse from one or both of the interliners 6 and 10 into the core 8. Likewise, Mg and/or Cu can diffuse from the core 8 into the interliners 6 or 10. Higher levels of Mg, Si and Cu result in higher post braze strengths, but the pre-braze solute contents within the alloys should be carefully selected to maintain the appropriate post braze galvanic relationships between the core 8, the first interliner 6 (e.g. airside) and the second interliner 10 (e.g.

layer 8. Preferably, the core 8 is more electrochemically noble than the first and second interliners 6 and 10 and that the electrochemical potential of interliners 6 and 10 is sacrificial to that of the core layer 8 in the environment to which the alloys are exposed. As a result of brazing, some interdiffusion of alloying elements will occur between the layers of the sheet 2. This interdiffusion is important in establishing the appropriate solute levels locally to produce a precipitation hardenable alloy with appropriate internal and external corrosion resistance. The internal corrosion resistance is expected to exceed 5 months of exposure without perforation to an internal corrosion test consisting of exposure to a modified OY water.

From the aforementioned table of preferred compositional ranges, the core layer 8 has a preferred Mg content ranging from about 0.1 to 1 wt. %. Any of the layers of the sheet 2 may have Mn additions for increased strength and/or elevated Ti levels (up to about 0.25 wt. %) for improved corrosion resistance. Higher Ti levels are generally not needed for improved corrosion resistance for the interliner alloy 10, particularly when the interliner has purposeful additions of Zn. For this invention, however, all such alloy additions must be made while keeping the solidus temperature of that particular layer above about 610° C.

Additions of Cr additions to the core layer alloy are optional. The addition of Cr should be controlled to avoid producing coarse Cr-containing particles, especially when the levels of each of Mn and Ti (Mn+Ti) are above about 1.3 wt. %.

The interliner layers 6 and 10 of this invention, when coupled to a magnesium-containing core layer CO, can dramatically increase the TYS values of the overall sheet after brazing. In fact, equivalent strengths and brazeability cannot be achieved simply by coupling an identical core alloy to a 4 xxx braze cladding, even when the 4 xxx layer is designed to provide a substantial amount of Si to the core during the braze cycle. It is believed that only through the use of interliner layers 6 and 10 can the four layer product of the present invention (when Mg contents in the core alloy are greater than 0.3 wt-%) be suitable for successful brazing with a Nocolok(®) type flux.

Although the invention has been described generally above, the particular examples gives additional illustration of the product of the present invention.

EXAMPLES

Four-layered brazing sheets made in accordance with the present invention were produced having layers with the compositions set forth in Table 2. The alloy combinations tested appear in Table 3 along with cladding ratios and data on post braze mechanical properties and internal corrosion resistance.

TABLE 2

| Alloy No. | Layer | Composition (wt. %) | | | | | | | |
|---|---|---|---|---|---|---|---|---|---|
| | | Si | Fe | Mn | Cu | Mg | Zn | Ti | Zr |
| 1 | Clad | 10.04 | 0.26 | 0.01 | 0.02 | 0.01 | 0.01 | 0.01 | 0.00 |
| 2 | First Interliner | 0.06 | 0.19 | 0.00 | 0.01 | 0.00 | 1.46 | 0.17 | 0.00 |
| 3 | First Interliner | 0.44 | 0.19 | 0.00 | 0.01 | 0.00 | 1.43 | 0.17 | 0.00 |
| 4 | First or Second Interliner | 0.29 | 0.24 | 0.97 | 0.00 | 0.00 | 0.11 | 0.17 | 0.00 |
| 5 | Core | 0.27 | 0.25 | 0.98 | 0.76 | 0.48 | 0.02 | 0.17 | 0.00 |
| 6 | Core | 0.26 | 0.25 | 0.97 | 0.84 | 0.49 | 0.02 | 0.19 | 0.00 |
| 7 | Core | 0.39 | 0.20 | 0.03 | 0.04 | 0.40 | 0.02 | 0.18 | 0.00 |
| 8 | Core | 0.59 | 0.20 | 0.03 | 0.04 | 0.40 | 0.02 | 0.18 | 0.00 |
| 9 | Core | 0.39 | 0.20 | 0.01 | 0.24 | 0.39 | 0.02 | 0.19 | 0.00 |
| 10 | Core | 0.58 | 0.20 | 0.01 | 0.24 | 0.37 | 0.02 | 0.20 | 0.00 |
| 11 | Core | 0.06 | 0.17 | 0.91 | 0.55 | 0.24 | 0.00 | 0.16 | 0.00 |
| 12 | Core | 0.06 | 0.13 | 0.73 | 0.30 | 0.48 | 0.01 | 0.12 | 0.08 |
| 13 | Core | 0.08 | 0.23 | 1.15 | 0.85 | 0.24 | 0.03 | 0.18 | 0.00 |
| 14 | Second Interliner | 0.73 | 0.24 | 0.31 | 0.00 | 0.01 | 1.53 | 0.16 | 0.00 |
| 15 | Second Interliner | 0.72 | 0.24 | 0.32 | 0.00 | 0.00 | 0.02 | 0.20 | 0.00 |
| 16 | Second Interliner | 0.74 | 0.19 | 0.00 | 0.01 | 0.00 | 1.39 | 0.18 | 0.00 |
| 17 | Second Interliner | 0.75 | 0.19 | 0.00 | 0.02 | 0.01 | 4.07 | 0.18 | 0.00 |
| 18 | Second Interliner | 0.08 | 0.19 | 0.00 | 0.02 | 0.01 | 4.29 | 0.18 | 0.00 |

TABLE 3

| Alloys used from Table 2 in sheet | Cladding ratio (%/%/%/%) | Post Braze Mechanical Properties* (MPa) | | | | | | Internal Corrosion** |
|---|---|---|---|---|---|---|---|---|
| | | As - Brazed (AB) | | AB + 30 days at RT (room temperature) | | AB + 7 days at RT + 30 days at 90° C. | | |
| | | UTS | TYS | UTS | TYS | UTS | TYS | |
| 1/2/7/17 | 13/25/37/25 | 100 | 41 | 118 | 51 | 171 | 107 | >4 months |
| 1/2/9/17 | 13/25/37/25 | 112 | 41 | 114 | 49 | 164 | 98 | >4 months |
| 1/2/7/16 | 13/25/37/25 | 105 | 39 | 116 | 50 | 153 | 96 | >4 months |
| 1/2/8/17 | 13/25/37/25 | 109 | 44 | 127 | 52 | 160 | 99 | >4 months |
| 1/2/10/17 | 13/25/37/25 | 106 | 43 | 129 | 54 | 165 | 96 | >4 months |
| 1/2/13/18 | 13/25/37/25 | 90 | 37 | 100 | 43 | 142 | 84 | >4 months |
| 1/2/11/17 | 13/25/37/25 | 114 | 48 | 123 | 47 | 143 | 65 | >4 months |
| 1/16/11/17 | 13/25/37/25 | 119 | 49 | 131 | 51 | 143 | 68 | >4 months |
| 1/2/12/17 | 13/25/37/25 | 125 | 49 | 149 | 62 | 191 | 116 | >4 months |
| 1/4/5/14 | 13/20/47/20 | 147 | 63 | NA | NA | 200 | 120 | NA |
| 1/4/6/14 | 13/20/47/20 | 141 | 69 | NA | NA | 201 | 131 | NA |
| 1/4/6/15 | 13/20/47/20 | 141 | 65 | NA | NA | 210 | 122 | NA |
| 1/4/5/16 | 13/20/47/20 | 144 | 65 | NA | NA | 208 | 122 | NA |
| 1/4/5/4 | 13/20/47/20 | 151 | 65 | NA | NA | 175 | 90 | NA |
| 1/4/5/17 | 13/20/47/20 | 145 | 65 | NA | NA | 198 | 119 | NA |
| 1/4/6/18 | 13/20/47/20 | 138 | 58 | NA | NA | 165 | 84 | NA |

*Braze cycle employed: 5 min above 590° C. with a peak metal temperature of 600° C.
**Internal corrosion test or coupons of test sheet in modified OY water. Time indicates exposure time of coupons (masked off to expose only waterside) without perforation.

The brazing sheet of the present invention is particularly suited for use as a tube for a radiator or a heat exchange. The tube may include a welded seam, or the tube may not be welded but is folded into shape and the edges of the sheet become sealed together as a result of the brazing process, particularly a Nocolok brazing process.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A multi-layered brazing sheet comprising:
   a core layer of an aluminum alloy containing by wt. % about 0.5–1.7 Mn, about 0.1–1 Mg, about 0.02–1.2 Cu, up to about 0.9% Si, and about 0.02–0.25 wt-% Ti;
   a first interliner layer positioned on one side of said core layer, said first interliner layer comprising an aluminum alloy containing by wt. % about 0.02–1.1 Si;
   a braze clad layer positioned on the other side of said first interliner layer, said clad layer comprising an aluminum alloy containing by wt. % 5–15 Si; and
   a second interliner layer positioned on the other side of said core layer, said second interliner layer comprising an aluminum alloy containing by wt. % about 0.02–1.1 Si,
   wherein the amount of Si in said core layer alloy is less than in at least one of the said first and second interliner alloys.

2. The brazing sheet of claim 1 wherein said clad layer alloy further comprises up to about 0.6 Fe, up to about 0.1 Mn, up to about 0.3 Cu and up to about 4 Zn.

3. The brazing sheet of claim 2 wherein said clad layer alloy comprises about 0.15–0.3 Fe and up to about 0.1 Cu.

4. The brazing sheet of claim 1 wherein said first interliner layer alloy further comprises up to about 0.6 Fe, up to about 1.7 Mn, up to about 0.3 Cu, up to about 0.1 Mg, up to about 4 Zn, and up to about 0.25 Ti.

5. The brazing sheet of claim 4 wherein said first interliner layer alloy comprises about 0.15–0.3 Fe, up to about 0.1 Cu, up to about 0.5 Mg.

6. The brazing sheet of claim 4 wherein said first interliner layer alloy is electrochemically more active than said underlying core layer alloy.

7. The brazing sheet of claim 1 wherein said core layer alloy further comprises up to 0.6 Fe and up to about 0.2 Zn.

8. The brazing sheet of claim 7 wherein said core layer alloy comprises about 0.15–0.3 Fe, about 0.25–0.6 Mg, and about 0.10–0.25 Ti.

9. The brazing sheet of claim 7 wherein said core layer alloy is more electrochemically noble than said alloys of said first and second interliner layers.

10. The brazing sheet of claim 1 wherein said second interliner layer alloy further comprises up to about 0.6 Fe, up to about 1.7 Mn, up to about 0.25 Cu, up to about 0.1 Mg, and up to about 6 Zn.

11. The brazing sheet of claim 10 wherein said second interliner layer alloy comprises about 0.15–0.3 Fe, up to about 0.1 Cu, up to about 0.05 Mg, and about 1–4 Zn.

12. The brazing sheet of claim 10 wherein said second interliner layer alloy is electrochemically more active than the core layer alloy.

13. The brazing sheet of claim 1 wherein said sheet is up to about 350 microns thick.

14. The brazing sheet of claim 1 wherein said sheet is about 120 to about 250 microns thick.

15. The brazing sheet of claim 10 wherein said clad layer is about 5–20% of the thickness said sheet, said first interliner layer is about 10–25% of the thickness said sheet, and said second interliner layer is about 10–30% of the thickness of said sheet.

16. The brazing sheet of claim 1 wherein the post braze tensile yield strength of said sheet exceeds about 60 MPa after aging for 30 days at 90° C.

17. The brazing sheet of claim 1 wherein the post braze ultimate tensile strength of said sheet exceeds about 150 MPa after aging for 30 days at 90° C.

18. The brazing of claim 1 wherein the post braze tensile yield strength of said sheet exceeds about 90 MPa after aging for 30 days at 90° C.

19. The brazing sheet of claim 1 wherein the post braze ultimate tensile strength of said sheet exceeds about 160 MPa after aging for 30 days at 90° C.

20. A multi-layered brazing sheet comprising:
    a core layer of an aluminum alloy consisting essentially of by wt. % about 0.5–1.7 Mn, about 0.1–1 Mg, about 0.02–1.2 Cu, up to about 0.9% Si, up to 0.6 Fe, up to about 0.2 Zn and about 0.02–0.25 Ti;
    a first interliner layer positioned on one side of said core layer, said first interliner layer comprising an aluminum alloy consisting essentially of by wt. % about 0.02–1.1 Si, up to about 0.6 Fe, up to about 1.7 Mn, up to about 0.3 Cu, up to about 0.1 Mg, up to about 4 Zn, and up to about 0.25 Ti;
    a braze clad layer positioned on the other side of said first interliner layer, said clad layer comprising an aluminum alloy consisting essentially of by wt. % 5–15 Si, up to about 0.6 Fe, up to about 0.1 Mn, up to about 0.3 Cu and up to about 4 Zn; and
    a second interliner layer positioned on the other side of said core layer, said second interliner layer comprising an aluminum alloy consisting essentially of by wt. % about 0.02–1.1 Si, up to about 0.6 Fe, up to about 1.7 Mn, up to about 0.25 Cu, up to about 0.1 Mg, and up to about 6 Zn,
    wherein the amount of Si in said core layer alloy is less than in each of said first and second interliner alloys.

21. The brazing sheet of claim 20 wherein said sheet is up to about 350 microns thick.

22. The brazing sheet of claim 20 wherein said sheet is about 120 to about 250 microns thick.

23. The brazing sheet of claim 20 wherein said clad layer is about 5–20% of the thickness said sheet, said first interliner layer is about 10–25% of the thickness said sheet, and said second interliner layer is about 10–30% of the thickness of said sheet.

24. The brazing sheet of claim 20 wherein the post brazed tensile yield strength of said sheet exceeds about 60 MPa after aging for 30 days at 90° C.

25. The brazing sheet of claim 20 wherein the post braze ultimate tensile strength of said sheet exceeds about 150 MPa after aging for 30 days at 90° C.

26. A tube for a radiator or a heater comprising the brazing sheet of claim 1.

27. A heat exchanger tube comprising the brazing sheet of claim 1 folded into a tube wherein edges of the sheet are sealed together via brazing.

28. The tube of claim 27 wherein said tube is brazed with flux.

* * * * *